(12) United States Patent
Jaramillo et al.

(10) Patent No.: US 10,800,460 B2
(45) Date of Patent: Oct. 13, 2020

(54) VEHICLE ROOF BEAD AND BOW STRUCTURE FOR CONTROLLING RESONANCE AND VIBRATION

(71) Applicant: TOYOTA MOTOR ENGINEERING & MANUFACTURING NORTH AMERICA, INC., Plano, TX (US)

(72) Inventors: Lucas A. Jaramillo, Ann Arbor, MI (US); Arthur H. Whitney, Fenton, MI (US)

( * ) Notice: Subject to any disclaimer, the term of this patent is extended or adjusted under 35 U.S.C. 154(b) by 29 days.

(21) Appl. No.: 16/228,210

(22) Filed: Dec. 20, 2018

(65) Prior Publication Data

US 2020/0198705 A1 Jun. 25, 2020

(51) Int. Cl.
*B62D 25/06* (2006.01)
*B62D 27/04* (2006.01)

(52) U.S. Cl.
CPC ............. *B62D 25/06* (2013.01); *B62D 27/04* (2013.01)

(58) Field of Classification Search
CPC ................................ B62D 25/06; B62D 27/04
USPC .............. 296/210, 203.01, 203.03, 1.08, 191
See application file for complete search history.

(56) References Cited

U.S. PATENT DOCUMENTS

| | | | |
|---|---|---|---|
| 8,641,137 B2 * | 2/2014 | Lizak | B60R 13/0206 296/214 |
| 2006/0290169 A1 | 12/2006 | Fukushima | |
| 2016/0214649 A1 | 7/2016 | Emura | |

FOREIGN PATENT DOCUMENTS

| | | | |
|---|---|---|---|
| DE | 102014012162 | 2/2016 | |
| JP | 2013099984 | 5/2013 | |
| JP | 5556633 | * 7/2014 | ............ B62D 25/06 |

* cited by examiner

*Primary Examiner* — Dennis H Pedder
(74) *Attorney, Agent, or Firm* — Sheppard, Mullin, Richter & Hampton LLP; Hector A. Agdeppa; Daniel N. Yannuzzi

(57) ABSTRACT

A vehicle roof panel that is tunable with respect to the occurrence of vibration and the resonant frequency of vibration is provided. A frequency gain associated with the vehicle roof panel has been determined to be a function of the ratio between the width of roof beads impressed upon a roof panel and a gap between adjacent roof beads. When the ratio is between approximately 0.5 and 4.7, the frequency gain associated with the vehicle roof linearly follows values of the ratio. Accordingly, varying the width of the roof beads and/or the gap between adjacent roof beads such that the ratio remains between approximately 0.5 and 4.7, results in the vehicle roof panel being tunable.

13 Claims, 7 Drawing Sheets

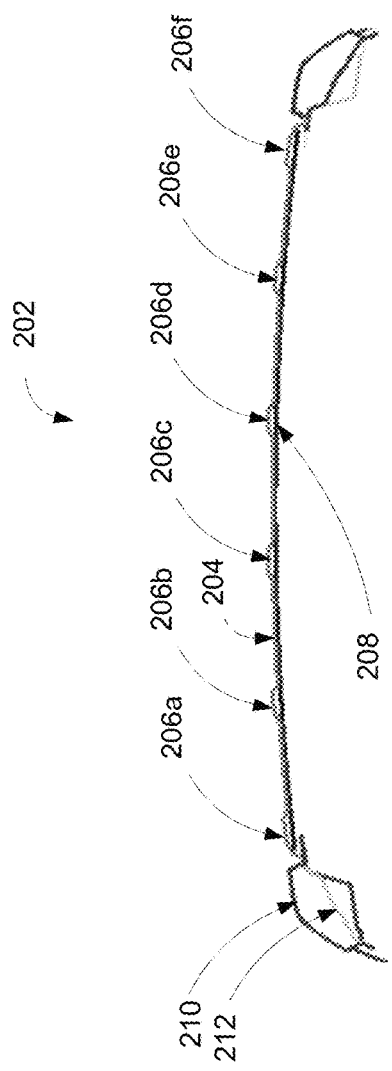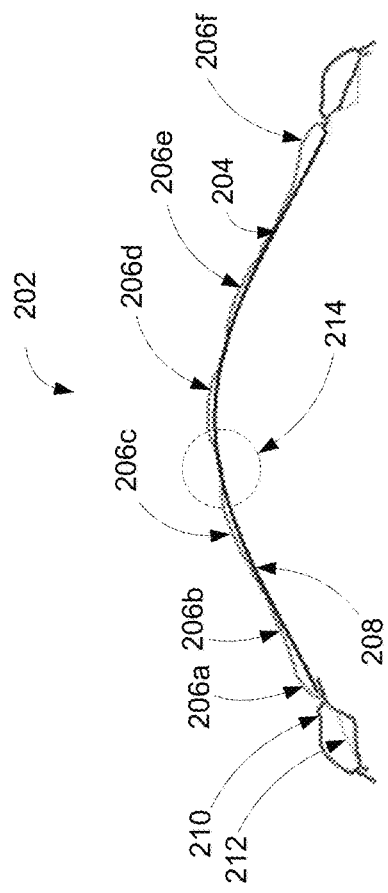

VEHICLE ROOF BEAD AND BOW STRUCTURE FOR CONTROLLING RESONANCE AND VIBRATION

TECHNICAL FIELD

The present disclosure relates generally to vehicle roof structures, and controlling, tuning, or otherwise manipulating characteristics of the vehicle roof structures, including vibration, resonance/natural frequency, and dynamic stiffness.

DESCRIPTION OF RELATED ART

Vehicles such as automobiles, may comprise, in part, a roof section or roof assembly covering or topping all or a portion of the automobile's interior cabin. For example, a roof section in conjunction with front and rear windshields, and one or more vertical supports (pillars) may comprise an upper portion of an automobile body. In some vehicles, a roof section may include a roof panel and a roof bow configured to support that roof panel.

BRIEF SUMMARY OF THE DISCLOSURE

In accordance with one embodiment, a physical component susceptible to vibration may comprise a panel having a plurality of beads formed thereon, and a bow having a first surface configured to be in touching relation with a first surface of the panel. Each of the plurality of beads may have a determined width, and adjacent beads may have a determined gap therebetween. A ratio of the determined width and the determined gap falls within a range of about 1.0 to about 4.7.

In one embodiment, the physical component comprises a roof section of a vehicle. In one embodiment, the panel comprises a roof panel. In one embodiment, the bow comprises a roof bow.

In one embodiment, the first surface of the bow comprises a top surface, and the first surface of the panel comprises a bottom surface.

In one embodiment, the top surface of the bow contacts the bottom surface of the panel such that the top surface of the bow maintains touching relation with the bottom surface of the panel, including concave portions of the beads.

In one embodiment, a frequency gain associated with the physical component is linearly variable over the ratio values within the range of about 1.0 to about 4.7

In one embodiment, the physical component further comprises one or more side support members operatively connected to at least one of the panel and the bow, the one or more side support members supporting the at least one of the panel and the bow.

In accordance with another embodiment, a frequency-tunable roof panel may comprise a plurality of beads formed in a surface of the frequency-tunable roof panel, wherein the frequency-tunable roof panel is in touching contact with a roof bow configured to conform to the tunable roof panel and an entirety of each of the plurality of beads. Each of the plurality of beads has a corresponding bead width, and each gap between two or more adjacent beads of the plurality of beads has a corresponding bead gap, such that a resonant frequency of the frequency-tunable roof panel is customizable and is a function of a ratio between the corresponding bead width and the corresponding bead gap.

In one embodiment, the resonant frequency of the frequency-tunable roof panel varies linearly in accordance with the ratio between the corresponding bead width and the corresponding bead gap, when the ratio falls between values of approximately 1.0 and 4.7.

In some embodiments, an upper surface of the roof bow conforms to a bottom surface of the frequency-tunable roof panel.

In some embodiments, each of the plurality of beads is formed to extend along a first direction commensurate with a length dimension of the frequency-tunable roof panel.

In some embodiments, each of the plurality of beads comprises a concave section bounded by sloped sections on either side of each of the plurality of beads.

In accordance with yet another embodiment, a vehicle roof assembly may comprise a roof panel comprising a sheet of metal having a plurality of beads the plurality of beads comprising elongated, concave impressions formed in the sheet of metal. The vehicle roof assembly may further comprise a roof bow conforming to and in touching contact with the roof panel, including inner surfaces of each of the plurality of beads. An occurrence of vibration at the vehicle roof assembly and a resonant frequency at which the vehicle roof assembly vibrates is controlled in accordance with a determined ratio value between a width value of each of the plurality of beads and a gap value associated with each gap between two adjacent beads of the plurality of beads.

In one embodiment, the determined ratio value is between approximately 1.0 and 4.7.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2A illustrates a cross-sectional view of a conventional roof panel, support roof bow, and side supports.

FIG. 2B illustrates an example roof bead deflection of the vehicle roof panel of FIG. 2B and deformation of a support bow.

The figures are not exhaustive and do not limit the present disclosure to the precise form disclosed.

DETAILED DESCRIPTION

Various embodiments of the present disclosure are directed to controlling, tuning, or otherwise manipulating vibration and resonance characteristics of a vehicle roof panel. Vehicle roof panels are generally manufactured from one or more metallic (e.g., steel, aluminum, or other metallic material sheets that have a certain desired thickness. However, because the thickness of the one or more metallic sheets tends to be much less (relatively speaking) than a length (e.g., 2.5 m) and width (e.g., 1 m) of the one or more metallic sheets, the one or more metallic sheets can tend to bend, warp, or otherwise deform. For example, conventional roof panels (and relevant support structures) may have thicknesses varying between approximately 0.5 mm to approximately 2.0 mm when manufacturing using raw metal. As will be discussed in greater detail below, deformation can include and/or result vibration effects as well as changes in resonance/natural frequency. It should be noted that various techniques or mechanisms may be used to join a roof panel to its relevant support structures, including but not limited to the use of adhesives, mastics, and welding.

Some roof panels have been designed to include certain structural elements, such as beads, to increase the stiffness of the roof panels. As used herein, a bead can refer to an elongated, drawn out impression/depression incorporated in a sheet or plate of some material, e.g., metal. Increasing the stiffness of the roof panels may combat the aforementioned deformation that a roof panel may experience. Some vehicles may have additional structures, e.g., roof racks or rails, that may be used to support loads, such as luggage. The inclusion of beads formed into the roof panel may also increase the strength of the roof panel. It should be understood that strength may generally refer to the ability of a material to withstand an applied load without experiencing, e.g., permanent deformation or rupture. It should also be understood that stiffness may generally refer to the degree to which an object resists its deformation in response to an applied load. However, conventional roof panel (and/or roof bow) configurations or designs do not address controlling vibrational and/or resonance characteristics. However, stiffness is not the only consideration that impacts the operational performance/characteristics of a roof panel or roof section/assembly, as a whole.

Various embodiments are directed to particular roof bead configurations of a roof panel that embody a specific roof bead width to gap ratio that exhibit desired vibration and/or resonance characteristics. That is, the width of a roof bread relative to the gap between adjacent roof beads have been discovered to lead to particular frequency gains that can be adapted or adjusted to comport with desired vibration and/or resonance characteristics.

Figure 1:
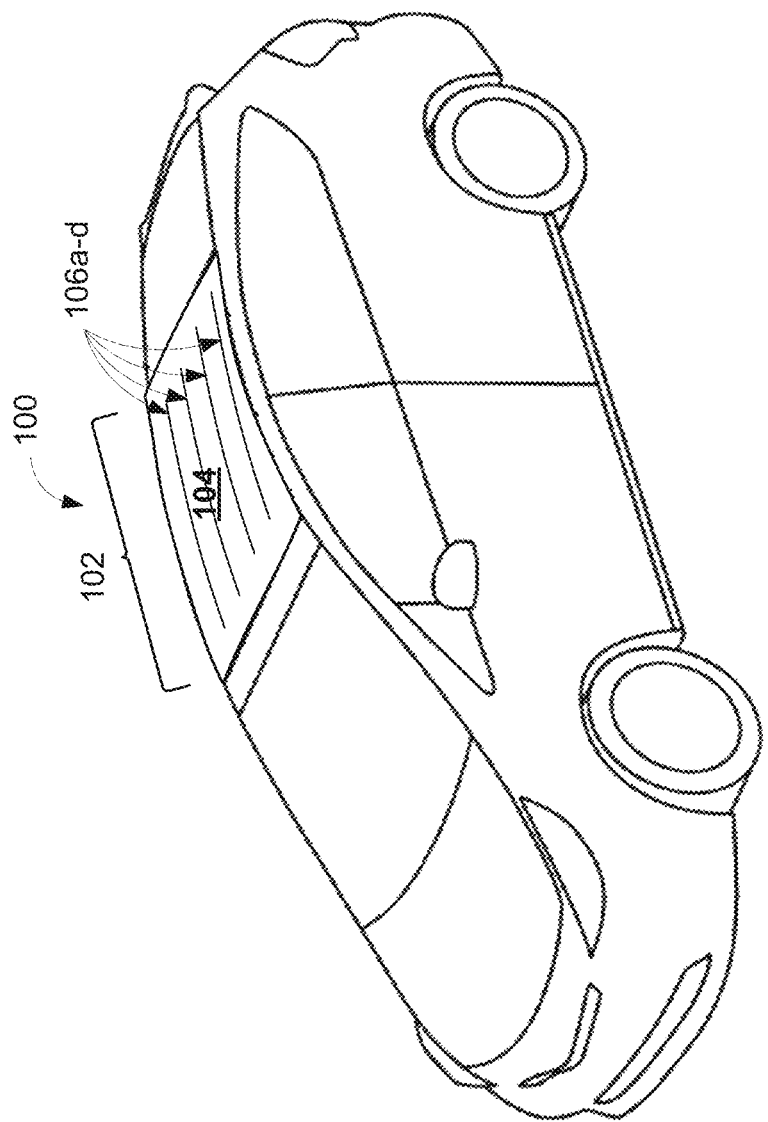
FIG. 1 illustrates a perspective view of an example vehicle having a roof section.

FIG. 1 illustrates a perspective view of a conventional vehicle 100. Conventional vehicle 100 may be a hybrid electric vehicle (HEV), an internal combustion engine (ICE)-only vehicle, an electric vehicle (EV), or other vehicle. Conventional vehicle 100 is illustrated as a having a roof section 102. As alluded to above, roof section 102 may comprise a roof panel 104 and a roof bow (not shown in FIG. 1). Some conventional vehicles may be designed to incorporate one or more roof beads 106a-d to, e.g., increase strength and/or stiffness of roof panel 104. It should be understood that as a result of conventional vehicle 100 traversing one or more sections of roadway, and/or as a result of certain operating conditions, roof panel 104 may vibrate or experience some other deformation. For example, roof panel 204 may vibrate at different amplitudes for each operating condition (or frequency). An operating condition may include a frequency signal sent into the vehicle body from any cyclical source, e.g., when the vehicle engine is operating such that its revolutions per minute (RPM) is greater than zero, when the vehicle tires experience any rotational velocity above zero, road input under steady state driving conditions, etc.

FIG. 2A illustrates a cross-sectional view of an example roof section 202 that may include a roof panel 204 in which a plurality of roof beads 206a-206f may be formed. Roof beads 206a-206f may increase strength and/or stiffness of roof panel 204. As noted above, some roof sections may include a supporting structure, such as a roof bow, illustrated in FIG. 2A as roof bow 208. The example roof section 202 may have roof panel 204 disposed over roof bow 208, where a top surface of roof bow 208 is in touching relation to a bottom surface of roof panel 204. However, as further illustrated in FIG. 2A, the constant, radiused contour of roof bow 208 is such that the top surface of roof bow 208 fails to come in contact with the bottom surface of roof section 202 at the locations where roof beads 206a-206f are implemented. That is, a gap remains between one or more portions of a top surface of roof bow 208 and one or more portions of roof panel 204 at raised sections of roof beads 206a-206f.

FIG. 2A further illustrates a side support 210 that may be a part of or integrated with roof bow 208. Roof panel 204 may also include a side support 212. Side supports 210/212 may be embodied as one or more pillars (e.g., an A pillar, B pillar, C pillar, or D pillar depending on a size and/or type of vehicle). For example, sedans tend to have A, B, and C pillars supporting roof panel 204/roof bow 208 at a forward section, middle section, and rear section of a vehicle ahead of a trunk area, whereas a minivan may include an additional D pillar at a rearmost section thereof.

FIG. 2B illustrates an example of roof bead deflection. As illustrated in FIG. 2B, and as a result of some deformation of roof section 202, roof beads of roof panel 204 may deform/deflect, "merge" with a neighboring roof bead, etc. For example, the original (un-deformed) shape of roof beads 206a, 206b (shown in FIG. 2A as generally having a concave section that plateaus into a lower, relatively flat section before rising to form a next roof bead) is generally uniform and repeating. However, when roof section 202 experiences some deflection or deformation, roof beads 206a, 206b may themselves deform into a different configuration/shape (e.g., from a concave to "flattened" shape. For example, the area at 214 reflects an area of significant roof bead deflection. For example, the deflection or deformation that roof section 202 can experience may range anywhere from the order of nanometers to approximately 10 mm.

Figure 3A:
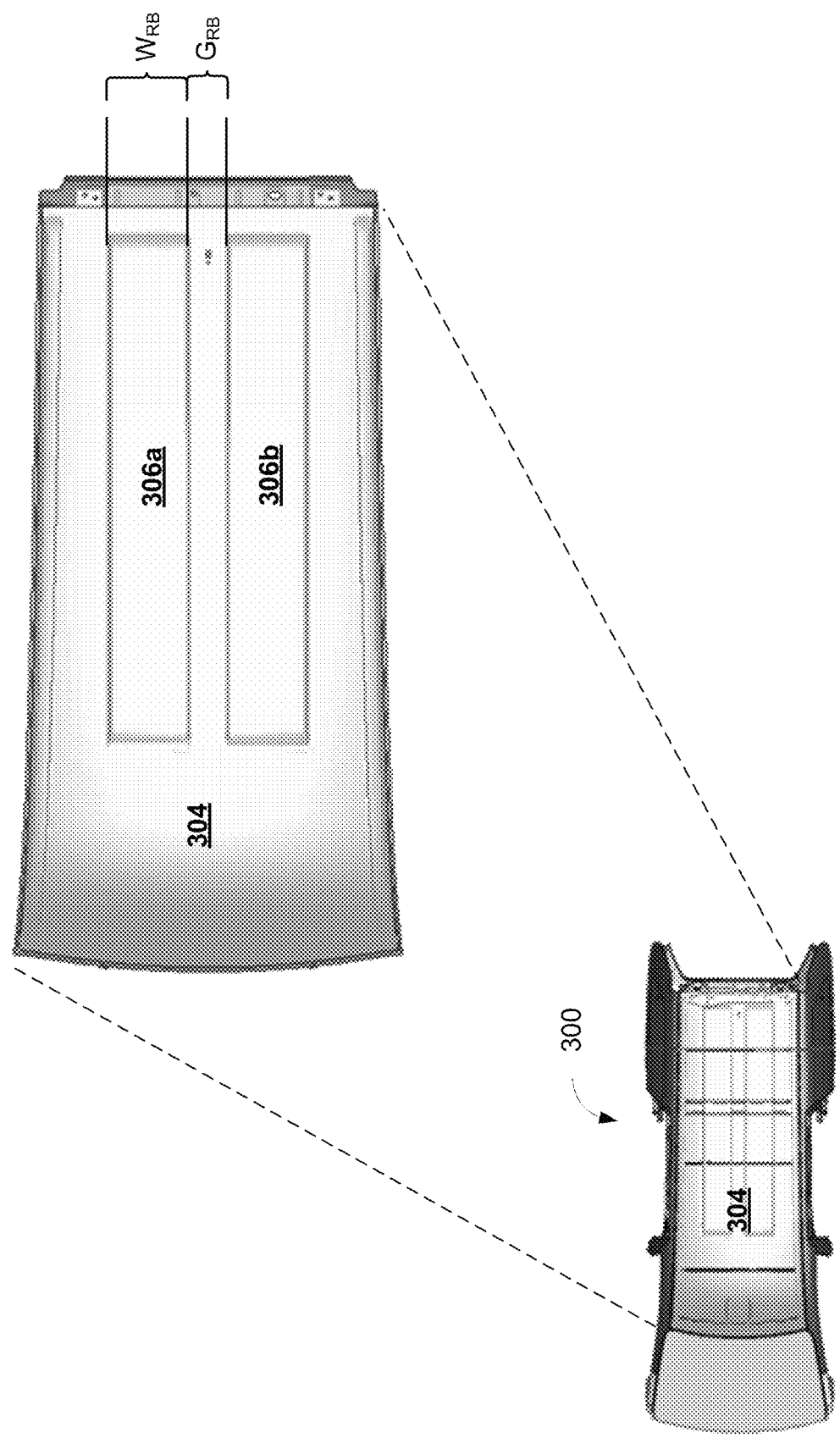
FIG. 3A illustrates a top view and expanded view of an example vehicle roof panel configured in accordance with one embodiment of the present disclosure.

FIG. 3A illustrates a top view of an example vehicle 300 having a roof section comprising a roof panel 304 (and a roof bow, not shown in FIG. 3A) configured in accordance with one embodiment of the present disclosure. As noted above, various embodiments disclosed herein are directed to a roof panel configuration in which a particular roof bead width (also referred to as $W_{RB}$) to roof bead gap (also referred to as $G_{RB}$) results in a particular ratio ($R_{WG}$) or falls within a particular range. As will be described in greater detail below, a ratio or range of ratios has been discovered to reflect a particular frequency gain or range of frequency gains that allows the vibrational and resonance characteristics of roof panel 304 to be tuned or optimized.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

As illustrated in FIG. 3A, a roof bead width refers to a width of the raised (concave) portion of a roof bead. In some embodiments, this roof bead width may encompass all or a part of the upward/downward slope of the edges of a roof bead. As will be discussed in greater detail below, the roof bead width (and gap) may be adjusted to account for/ accommodate different considerations, e.g., overall width and/or length of roof panel 204, placement of a roof antenna, etc. It should be understood that although the example configuration of roof panel 304 illustrated by FIG. 3A only includes two roof beads 306a and 306b, more roof beads may be implemented. It should be noted that implementation of a single roof bead is contemplated. However, depending on the application, less roof beads may compromise roof panel strength.

Figure 3B:
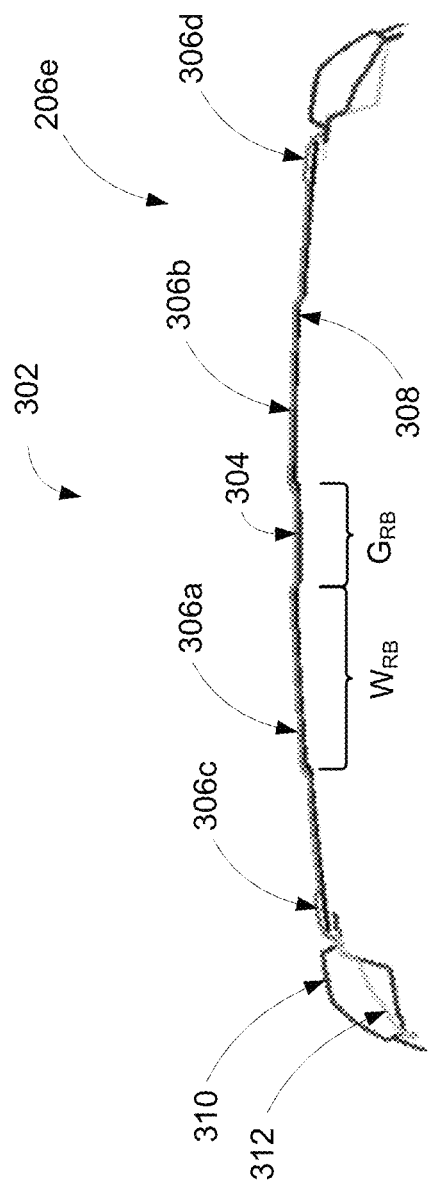
FIG. 3B illustrates a cross-sectional view of the vehicle roof panel of FIG. 3A, a support roof bow, and side supports.

FIG. 3B illustrates a cross-sectional view of example roof section 302 that may include roof panel 304 in which a plurality of roof beads 306a, 306b may be formed. FIG. 3B further illustrates a supporting structure, such as a roof bow 308. In contrast to conventional roof sections where the roof bow (e.g., roof bow 208 of FIG. 2A) does not conform to the concave sections of each roof bead (e.g., roof beads 206a-206f), an upper surface of roof bow 308 is in touching relation to the entirety (or a substantial majority) of roof panel 304 in accordance with various embodiments. That is, and as illustrated in FIG. 3B, roof bow 308 is radiused, while also conforming to the shape of each roof bead 306a and 306b.

Similar to roof section 202 of FIG. 2A, roof section 302 may include or be integrated with a side support 310 that may be a part of or integrated with roof bow 308. Roof panel 304 may also include a side support 212. Side supports 310/312 may be embodied as one or more pillars or shear panels (e.g., an A pillar, B pillar, C pillar, or D pillar depending on a size and/or type of vehicle). It should be understood that side supports 310/312 may be increased in stiffness to correspond to an increase in stiffness of the roof panel 304 (or effective stiffness as a result of roof bow 308 due to their touching relationship and radius of roof bow 308 whose stiffness generally increases as curvature increases). It should be understood that conventionally-used materials, such as steel, aluminum, etc., may be used in accordance with various embodiments. That is, no change of materials is necessarily required in order to implement the disclosed roof bead/roof bow configuration(s).

Figure 3C:
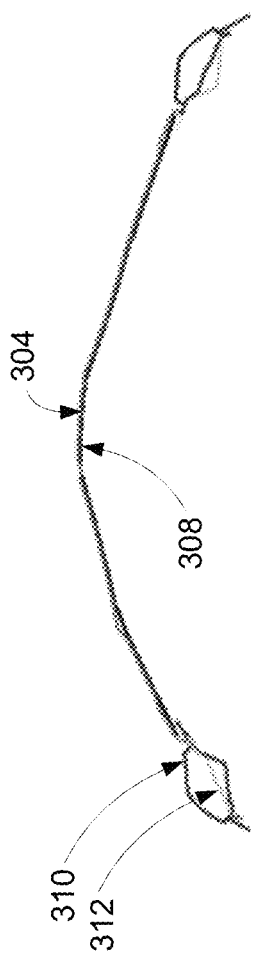
FIG. 3C illustrates an example roof bead deflection of the vehicle roof panel of FIG. 3B and corresponding deformation of a support bow.

FIG. 3C illustrates an example of roof bead deflection that can result when roof beads configured in accordance with one embodiment to have an optimal roof bead width to roof bead gap ratio. For example, as a result of some deformation of roof section 302, it can be appreciated that roof beads 306a, 306b of roof panel 304 may still deform/deflect. However, this resulting deformation/deflection occurs in such a way that the entirety (or substantial majority) of an upper surface of roof bow 308 remains in touching relation to a bottom surface of roof panel 304. This continued contact between roof bow 308 and roof panel 304 can increase the strength/stiffness of roof panel 304, while assisting to ensure that resonance can be controlled through the use of a particular roof bead width and roof bead gap.

Not only does the aforementioned conforming contact between roof bow 308 and roof panel 304 result in increased strength/stiffness of roof panel 304, but an unforeseen ability to control/tune/optimize vibration and resonance of roof panel 304 arises when roof beads 306a and 306b are configured in accordance with various embodiments. While a person of ordinary skill in the art would understand that bead length, width, and imprint depth may be adjusted to obtain a desired strengthening or stiffening effect, the impact of the roof bead width to roof bead gap ratio on vibration and resonance was heretofore, unknown in the art. Hence, continued contact between roof panel 304 (with roof beads 206a, 306b) and roof bow 308 can impact the overall stiffness of a roof section including roof panel 304 and roof bow 308. This in turn impacts the resonant frequency of roof panel 304 (which can be tuned by adjusting $R_{WG}$).

Figure 4:
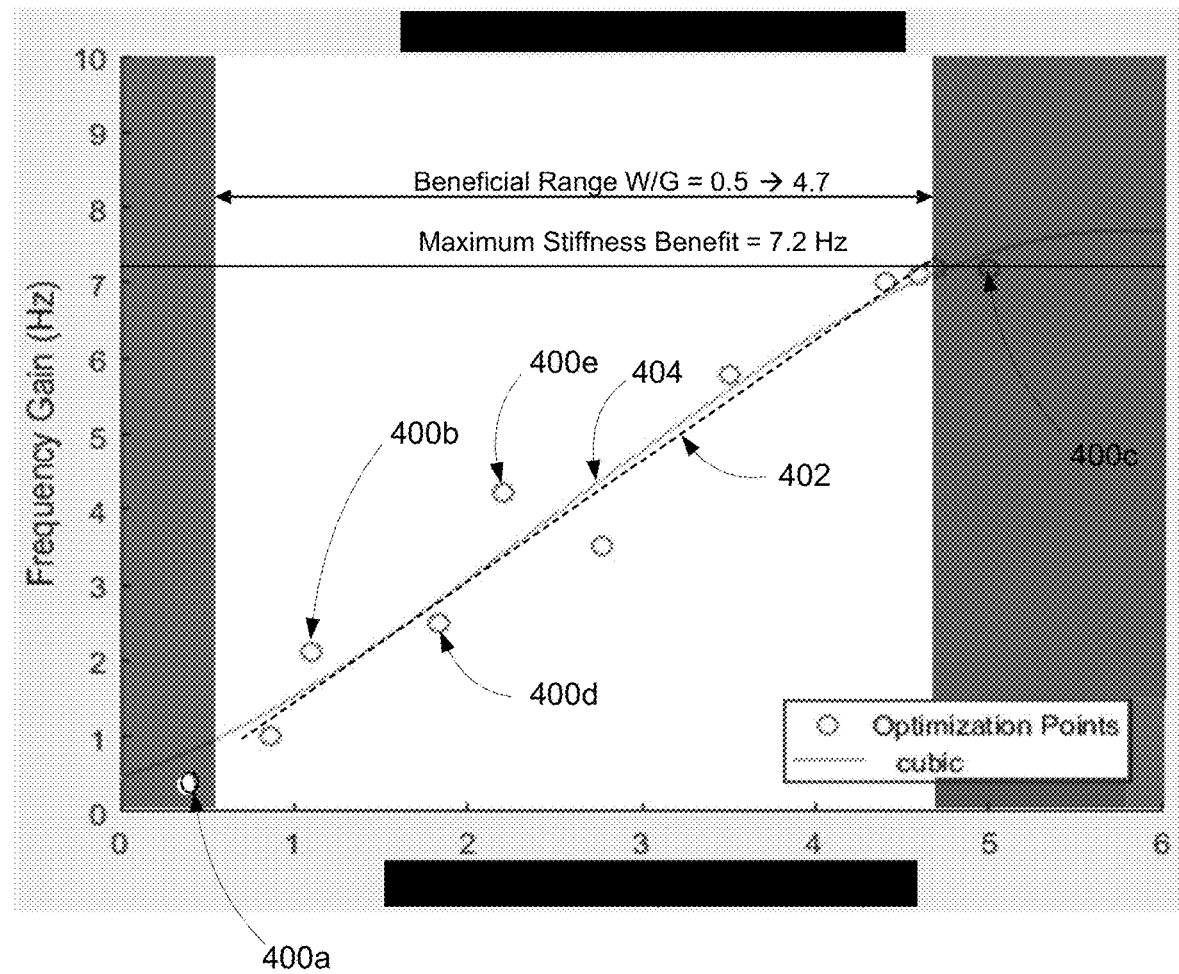
FIG. 4 is a graphical illustration of frequency gain associated with a roof panel as a function of a roof bead width-to-gap ratio in accordance with one embodiment of the present disclosure.

FIG. 4 is an example graph illustrating frequency gain associated with a roof panel as a function of a roof bead width to roof bead gap ratio in accordance with one embodiment of the present disclosure. As noted above, it has been discovered that vibration and resonance of a roof panel can be tuned based on a particular roof bead width to roof bead gap ratio or range of ratios ($W_{RB}/G_{RB}$). That is, it has been discovered that when the ratio of roof bead width to roof bead gap ($R_{WG}$) is between approximately 1.0 to approximately 4.7, the frequency gain associated with vibration and resonance of a roof panel experiences a more or less, linear progression based on $R_{WG}$. This reaction of frequency gain to $R_{WG}$ means that frequency gain can be tuned. It should be understood that the above-noted range of $R_{WG}$ values need not be exactly adhered to, as certain adjustments regarding roof bead width and roof bead gap may have to be tweaked to account for the location of an antenna of the roof panel, dimensions of the roof panel, and/or other considerations.

For example, FIG. 4 illustrates that conventional roof panel configurations have an $R_{WG}$ of the roof panel that is generally less than 0.5 (e.g., approximately 0.4), illustrated as point 400a. In this range (or after an $R_{WG}$ of the roof panel of approximately 4.7, as evidenced by point 400c), the graph reflects frequency gains that tend to level out, meaning there would be little difference in frequency gain based on any configuration of roof panel bead width and roof panel bead gap resulting in an $R_{WG}$ of the roof panel that is generally less than 0.5 or greater than 4.7. However, when the configuration of roof panel bead width and roof panel bead gap results in an $R_{WG}$ of the roof panel that is between approximately 0.5 and 4.7, adjustment to the configuration does result in an appreciable impact to frequency gain/stiffness remains approximately or effectively the same. This is evidenced by, e.g., point 400b and other optimization points falling within the $R_{WG}$ range of approximately 0.5 to 4.7.

It should be understood that a maximum stiffness benefit that can generally be achieved is approximately 7.0-7.2 Hz. In other words, the natural frequency of a system can be a function of mass of the system and stiffness of the system, represented as follows:

$$\text{Frequency (Hz)} = \text{Frequency (Hz)} = \frac{\sqrt{\text{Stiffness}(K)}}{\text{Mass}(m)},$$

where the stiffness of the system, in this case, a roof panel) can be optimized by adjusting roof panel bead width and roof panel bead gap. It should be noted that the dashed line 402 reflects a linear regression (y-1.5x+0.083) that provides a mathematical representation of the frequency gain to $R_{WG}$ relationship, and that corresponds well or is commensurate with the optimization points. It should also be noted that the solid line 404 reflects a cubic fit of all optimization points between approximately 0.5 to 4.7 $R_{WG}$. Accordingly, implementation of various embodiments can result in, e.g., changes to the dynamic stiffness of a roof panel, without any need to add additional support(s), mass, or other structure(s).

As used herein, the term "vibration" can refer to a mechanical phenomenon, wherein oscillations occur about some equilibrium point. As used herein, the term "resonance" can refer to a particular vibrational frequency where energy can be efficiently transferred into a system. Thus, when a system is vibrating at its resonant frequency, the vibrations would build on each other, resulting in, e.g., vibrations with greater and greater amplitude, which would be undesirable in the case of vehicle's roof panel. That is, when the vehicle is being operated/driven by an engine and/or motor rotating at a specific rate (rotations per minute (RPM)), the roof panel tends to vibrate and resonate at a particular frequency. By tuning or adjusting the $R_{WG}$ of the roof panel, along with increasing stiffness of the roof panel vis-à-vis a roof bow that conforms to the roof panel/roof panel beads, that resonant frequency can be configured to occur outside of normal or standard driving or operating conditions of the vehicle. In other words, the characteristics of the roof panel can be adapted such that vibration of the roof panel can be reduced/negated through increasing stiffness of the roof panel (or effective stiffness as a result of roof bow). As a result of reducing/negating vibrations, the vibrations that do occur (when they occur), and the frequency at which the roof panel resonates due to such vibrations, will not occur under normal or standard driving conditions.

Figure 5A:
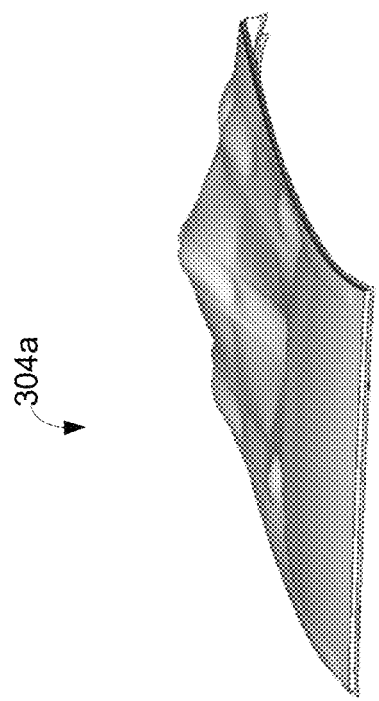
FIGS. 5A and 5B illustrate example vibration patterns of example vehicle roof panels.
Figure 5B:
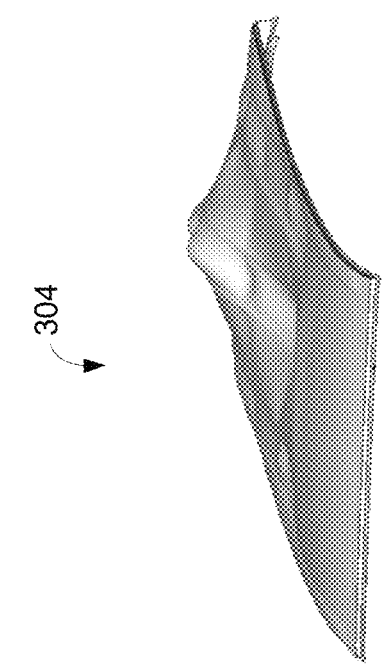

FIGS. 5A and 5B illustrate example vibration patterns exhibited by a roof panel 304 and a roof panel 304a, when configured in accordance with various embodiments. As previously noted, the advantages gained through the addition of roof beads and conforming roof bow in accordance with various embodiments can be achieved with differing numbers of roof beads. In some embodiments, a two roof bead configuration may be used. FIG. 5A illustrates an example resonance occurring generally at a rear section or portion of roof panel 304, and an example resonance occurring generally at a center section or portion of roof panel 304, when the roof bead width to roof bead gap ratio is approximately 1.833. See, for example, $W_{RB}/G_{RB}$ 400d in FIG. 4. FIG. 5B illustrates an example resonance occurring generally at a rear section or portion of roof panel 304a, and an example resonance occurring generally at a center section or portion of roof panel 304a, when the roof bead width to roof bead gap ratio is approximately 2.5. See, for example, $W_{RB}/G_{RB}$ 400e in FIG. 4.

Figure 6A:
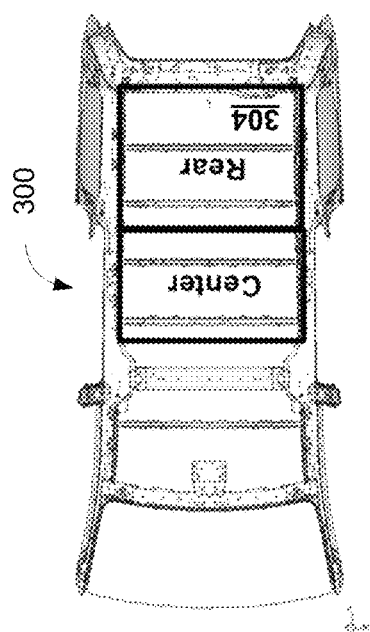
FIG. 6A illustrates a top view of an example vehicle roof panel configured in accordance with one embodiment of the present disclosure.
Figure 6B:
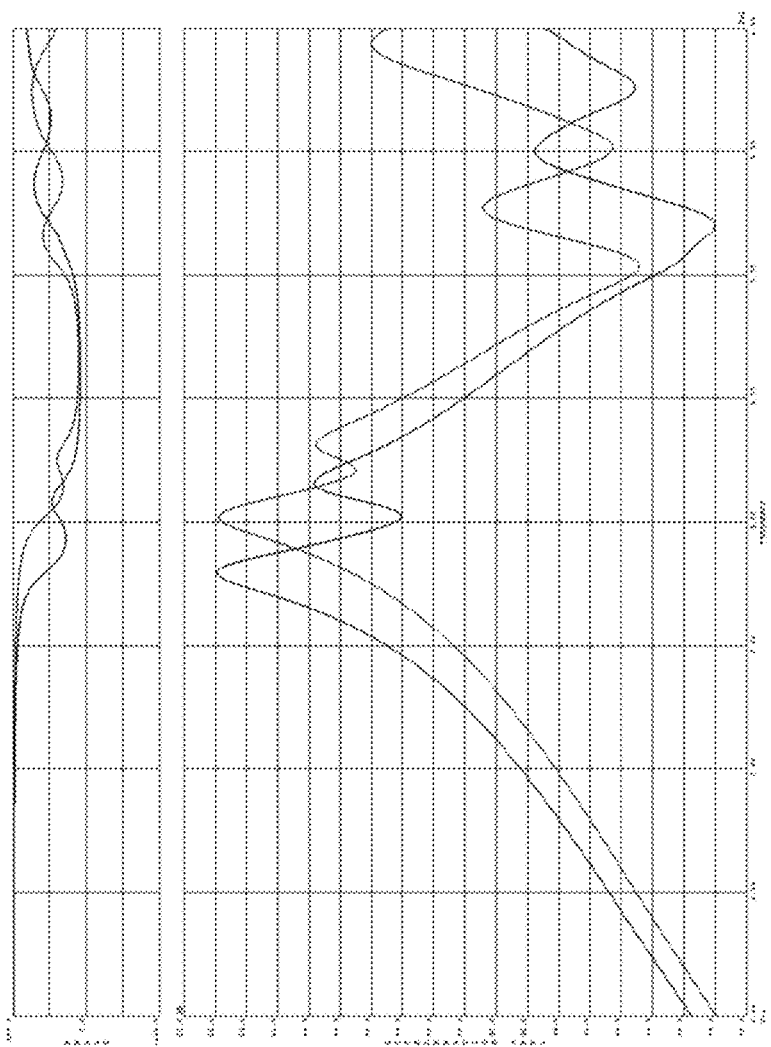
FIG. 6B is a graphical illustration of vibrational frequency experienced at a center section of the example vehicle roof panel of FIG. 6A.

FIG. 6A illustrates a top view of roof panel 304 of vehicle 300. As illustrated in FIG. 6A, roof panel 304 can be divided into a center portion or section and a rear portion of section, where the vibration/resonance of center and rear portions/sections are related. Generally, a center portion of roof panel 304 will experience higher levels of/more vibrations relative to the rear portion of roof panel 304. Nevertheless, rear resonance of roof panel 304 (when configured with the appropriate roof bead with to roof bead gap ratio) can experience relatively large increases in resonant frequency, e.g., from approximately 28 Hz for a conventionally-configured roof panel, to approximately 51 Hz when the roof panel is configured in accordance with various embodiments. A person of ordinary skill in the art would understand that such an increase is generally unachievable without adding more structure/material (e.g., 10 pounds or more mass) to the roof panel. It should be noted that increasing stiffness by increasing roof bead height is possible, but by virtue of increasing bead height, the support height of the roof bow also must increase. FIG. 6B is a graphical representation of natural frequency (also known as intertance) at a center portion of roof panel 304 illustrated in FIG. 3A, e.g., approximately at a midpoint of the width of roof panel 304 and approximately at a midpoint between roof beads 306a/b. FIG. 6B illustrates amplitude of vibration (referred to as "acceleration opti") and phase as a function of frequency as proof that frequency/vibration can be tuned based on $W_{RB}/G_{RB}$. It can be recognized that a shift (x-axis gain) of approximately 2.5 Hz is realized when using a $W_{RB}/G_{RB}$ ratio of 2.5 versus 1.833.

It should be understood that tuning or adjusting the frequency gain of a system or element that experiences vibration/resonance has applicability outside of merely vehicle roof panels. For example, application of a particular bead width to bead gap ratio to a system may be relevant in the aerospace context, e.g., airplane wings, in the building context, e.g., structural building elements, such as a walls, and with respect to aerodynamic elements, e.g., fins, spoilers, etc. Indeed, any system or element/component that is made of relatively thin material relative to footprint (width/length) can experience benefits in accordance with various embodiments.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A physical component susceptible to vibration, comprising:
   a panel having a plurality of beads formed thereon; and
   a bow having a first surface configured to be in touching relation with a first surface of the panel;
   wherein each of the plurality of beads have a determined width, and wherein adjacent beads have a determined gap therebetween; and
   wherein a ratio of the determined width and the determined gap falls within a range of about 1.0 to about 4.7, and wherein a frequency gain associated with the physical component is linearly variable over the ratio values within the range of about 1.0 to about 4.7.

2. The physical component of claim 1 comprising a roof section of a vehicle.

3. The physical component of claim 1, wherein the panel comprises a roof panel.

4. The physical component of claim 1, wherein the bow comprises a roof bow.

5. The physical component of claim 1, wherein the first surface of the bow comprises a top surface, and the first surface of the panel comprises a bottom surface.

6. The physical component of claim 5, wherein the top surface of the bow contacts the bottom surface of the panel such that the top surface of the bow maintains touching relation with the bottom surface of the panel, including concave portions of the beads.

7. The physical component of claim 1, further comprising one or more side support members operatively connected to at least one of the panel and the bow, the one or more side support members supporting the at least one of the panel and the bow.

8. A frequency-tunable roof panel, comprising:
   a plurality of beads formed in a surface of the frequency-tunable roof panel, wherein the frequency-tunable roof panel is in touching contact with a roof bow configured to conform to the tunable roof panel and an entirety of each of the plurality of beads;
   wherein each of the plurality of beads has a corresponding bead width, and wherein each gap between two or more adjacent beads of the plurality of beads has a corresponding bead gap, such that a resonant frequency of the frequency-tunable roof panel is customizable and is a function of a ratio between the corresponding bead width and the corresponding bead gap.

9. The frequency-tunable roof panel of claim 8, wherein the resonant frequency of the frequency-tunable roof panel varies linearly in accordance with the ratio between the corresponding bead width and the corresponding bead gap, when the ratio falls between values of approximately 1.0 and 4.7.

10. The frequency-tunable roof panel of claim 8, wherein each of the plurality of beads is formed to extend along a first direction commensurate with a length dimension of the frequency-tunable roof panel.

11. The frequency-tunable roof panel of claim 8, wherein each of the plurality of beads comprises a concave section bounded by sloped sections on either side of each of the plurality of beads.

12. A vehicle roof assembly, comprising:
   a roof panel comprising a sheet of metal having a plurality of beads, the plurality of beads comprising elongated, concave impressions formed in the sheet of metal;
   a roof bow conforming to and in touching contact with the roof panel, including inner surfaces of each of the plurality of beads;
   wherein an occurrence of vibration at the vehicle roof assembly and a resonant frequency at which the vehicle roof assembly vibrates is linearly variable and customizably controlled in accordance with a determined ratio value between a width value of each of the plurality of beads and a gap value associated with each gap between two adjacent beads of the plurality of beads.

13. The vehicle roof assembly of claim 12, wherein the determined ratio value is between approximately 1.0 and 4.7.

* * * * *